US00RE46944E

(19) United States
(12) Reissued Patent
Mawhinney et al.

(10) Patent Number: US RE46,944 E
(45) Date of Reissued Patent: Jul. 10, 2018

(54) VARIABLE ORIENTATION FLUID LEVEL SENSOR WITH OPTIONAL SLOSH GUARD

(71) Applicant: Continental Automotive Systems, Inc., Auburn Hills, MI (US)

(72) Inventors: Nicholas Lee Mawhinney, Fenton, MI (US); Michael Zaitz, Royal Oak, MI (US)

(73) Assignee: Continental Automotive System, Inc., Auburn Hills, MI (US)

(21) Appl. No.: 15/079,618

(22) Filed: Mar. 24, 2016

Related U.S. Patent Documents

Reissue of:
(64) Patent No.: 9,003,878
Issued: Apr. 14, 2015
Appl. No.: 13/622,746
Filed: Sep. 19, 2012

U.S. Applications:
(60) Provisional application No. 61/579,226, filed on Dec. 22, 2011.

(51) Int. Cl.

| | |
|---|---|
| ***G01F 23/00*** | (2006.01) |
| ***G01F 23/56*** | (2006.01) |
| ***G01F 23/76*** | (2006.01) |
| ***G01F 23/38*** | (2006.01) |
| ***F16K 31/18*** | (2006.01) |
| ***G01F 23/32*** | (2006.01) |
| ***G01F 23/74*** | (2006.01) |
| ***B60S 1/50*** | (2006.01) |
| ***G01F 23/36*** | (2006.01) |

(52) U.S. Cl.
CPC ..... *G01F 23/38* (2013.01); *B60S 1/50* (2013.01); *F16K 31/18* (2013.01); *G01F 23/32* (2013.01); *G01F 23/36* (2013.01); *G01F 23/74* (2013.01); *Y10T 137/7358* (2015.04)

(58) Field of Classification Search
None
See application file for complete search history.

(56) References Cited

U.S. PATENT DOCUMENTS

| | | | | |
|---|---|---|---|---|
| 3,678,232 A | | 7/1972 | Hodges | |
| 4,744,247 A | * | 5/1988 | Kaminski | B60K 15/077 338/33 |
| 5,284,005 A | * | 2/1994 | Jacobi | 54/44.2 |

(Continued)

FOREIGN PATENT DOCUMENTS

| | | |
|---|---|---|
| EP | 2228273 A2 | 7/2010 |
| GB | 2164107 A | 3/1986 |

(Continued)

OTHER PUBLICATIONS

English translation of the corresponding JP Office Action dated Jul. 11, 2016.

(Continued)

*Primary Examiner* — Robert Nasser

(57) ABSTRACT

A fluid level sensor assembly comprises a sensor mounted to a sensor housing. A carrier extends from the sensor housing in an angled orientation. A float is located within the carrier such that the float may move along a longitudinal axis of the carrier. A fragment is secured to the float, and the sensor detects a location of the fragment as the float moves within the carrier.

26 Claims, 4 Drawing Sheets

(56) References Cited

U.S. PATENT DOCUMENTS

| | | | | |
|---|---|---|---|---|
| 8,261,613 | B2 * | 9/2012 | Husain | 73/313 |
| 2002/0005041 | A1 | 1/2002 | Shinohara | |
| 2004/0200278 | A1 * | 10/2004 | Gansebom | H01H 36/02 73/305 |
| 2007/0283755 | A1 * | 12/2007 | Betz et al. | 73/313 |
| 2010/0043543 | A1 * | 2/2010 | Husain | 73/313 |
| 2012/0324996 | A1 * | 12/2012 | Taylor | 73/313 |

FOREIGN PATENT DOCUMENTS

| | | | |
|---|---|---|---|
| JP | S53-127767 | A | 11/1978 |
| JP | S62-32322 | A | 2/1987 |
| JP | H3-81520 | A | 8/1991 |
| JP | 2007205539 | A | 8/2007 |
| WO | 2008047377 | A1 | 4/2008 |

OTHER PUBLICATIONS

International Search Report and the Written Opinion of the International Searching Authority, PCT/US2012/068881, dated Apr. 25, 2013.

* cited by examiner

VARIABLE ORIENTATION FLUID LEVEL SENSOR WITH OPTIONAL SLOSH GUARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

This application is a non-provisional of, and claims priority to the Dec. 22, 2011, filing date of, U.S. provisional patent application Ser. No. 61/579,226, the entire content of which is incorporated herein by reference.

TECHNICAL FIELD

The present disclosure relates to fluid level sensors and/or float switches.

BACKGROUND

Currently, the fluid level sensors used in the washer bottle segment for vehicles are not capable of being used in a side mount or bottom mount location with the same design. It requires two different fluid level sensor designs to handle the different mounting locations. Also, the reed switch design of the current sensors requires parallel orientation and movement of the magnet to the reed switch; meaning the magnet and reed switch are parallel to each other.

Current fluid level sensor designs do use a float approach with a magnet and reed switch. The float designs are also limited with the current designs to rings or U-shaped floats. Also, depending on the requirement of the product for the sensor, slosh guard protection requires a different design of the sensor. Some products require a slosh guard for their fluid level sensors, while others do not. This variability leads to different design approaches of the sensor, depending on this requirement of a slosh guard.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fluid level sensor assembly comprises a sensor mounted to a sensor housing. A carrier extends from the sensor housing in an angled orientation. A float is located within the carrier such that the float may move along a longitudinal axis of the carrier. A fragment is secured to the float, and the sensor detects a location of the fragment as the float moves within the carrier.

A fluid level sensor assembly comprises reed switch mounted to a sensor housing. A carrier extends from the sensor housing in an angled orientation, such as at a 45 degree angle. A float with a barrel shape is located within the carrier such that the float may move along a longitudinal axis of the carrier and is prevented from rotating transverse to the longitudinal axis of the carrier. A magnetic fragment is secured at one of the float. The float is assembled within the carrier such that the magnetic fragment is closest to the reed switch such that the reed switch can detect a location of the magnetic fragment.

A washer reservoir and fluid level sensor assembly comprises a fluid level sensor and a reservoir having one of a side mounting location and a bottom mounting location. The fluid level sensor comprises a sensor mounted to a sensor housing and a carrier extending from the sensor housing in an angled orientation. A float is located within the carrier such that the float may move along a longitudinal axis of the carrier. A fragment is secured to the float, and the sensor detects a location of the fragment. A connector is secured to the sensor housing on an opposing side from the carrier. The connector has a connector pin electrically connected to the sensor, and a flanged backing to secure the connector to the sensor housing. A grommet is assembled on the exterior of the sensor housing. The fluid level sensor is assembled to the reservoir at the mounting location such that a grommet fluidly seals the fluid level sensor within the reservoir and the connector is accessible to the exterior of the washer reservoir Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
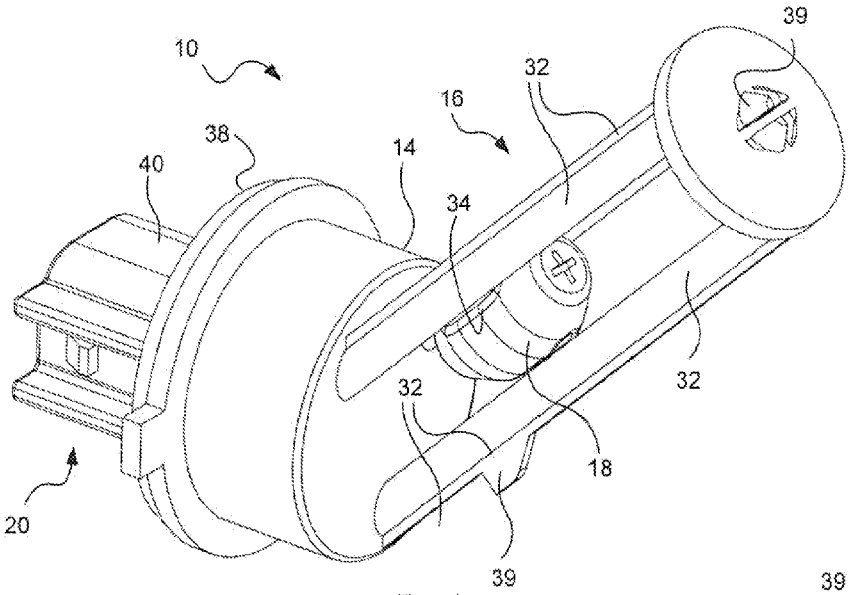
FIG. 1 is a schematic illustration of a perspective view of a first embodiment of a fluid level sensor assembly.
Figure 2:
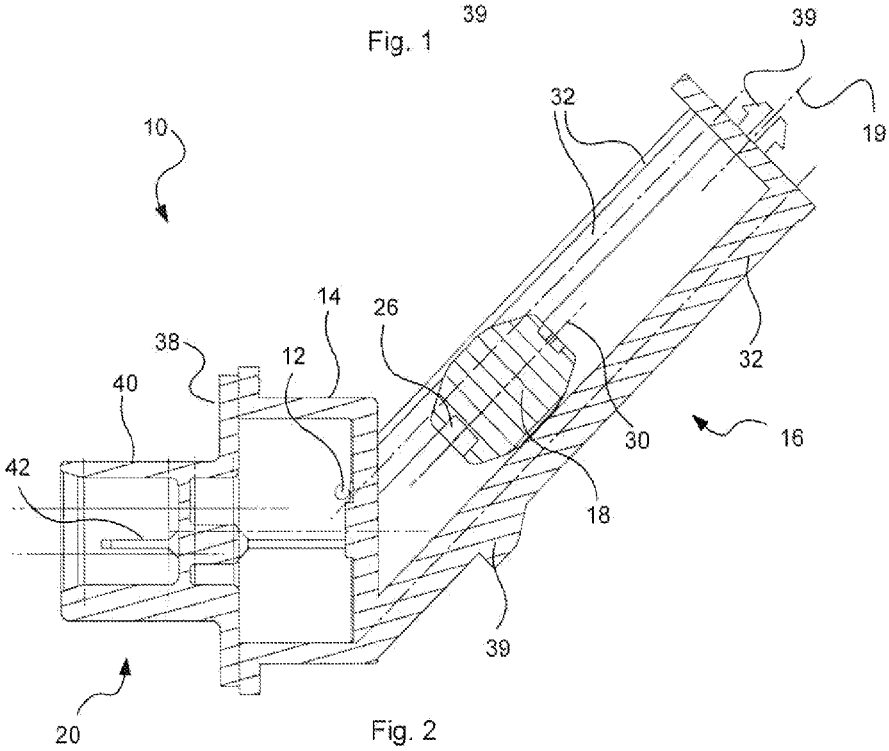
FIG. 2 is a schematic cross-sectional illustration of a side view of the first embodiment of the fluid level sensor assembly shown in FIG. 1.
Figure 3:
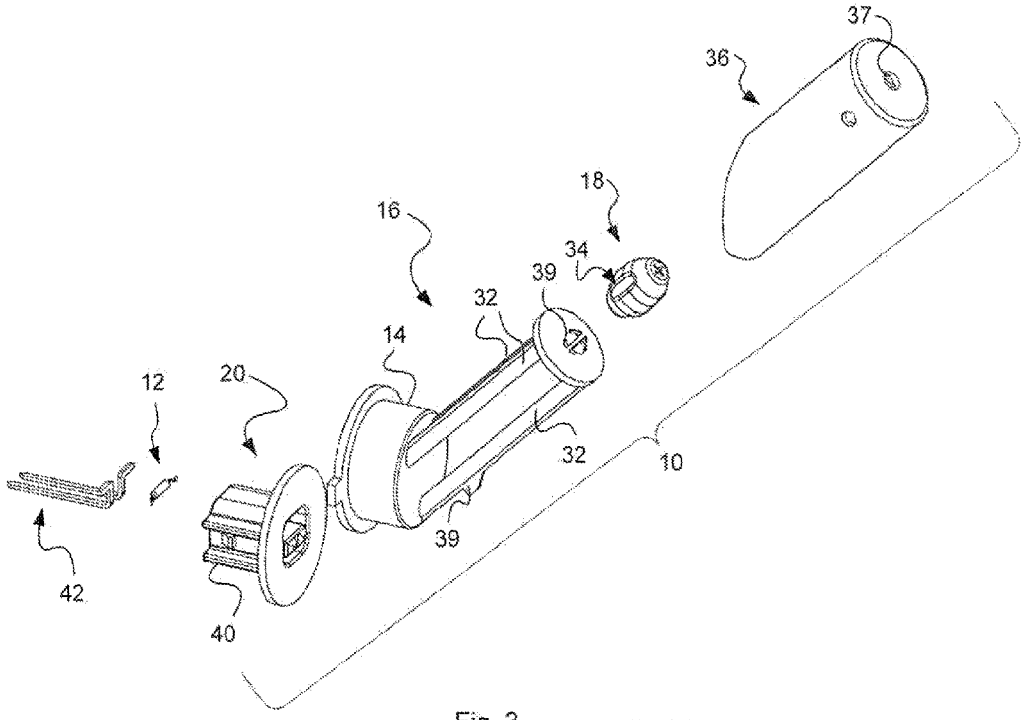
FIG. 3 is a schematic illustration of a exploded view of the first embodiment of the fluid level sensor assembly with a slosh guard.
Figure 4:
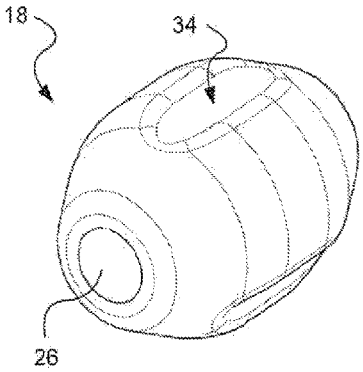
FIG. 4 is a schematic illustration of a perspective view of a float for the first embodiment of the fluid level sensor assembly shown in FIG. 1.

The following description is merely exemplary in nature and is in no way intended to limit the disclosure, its application, or uses. For purposes of clarity, the same reference numbers will be used in the drawings to identify similar elements. FIG. 1 thru FIG. 3 illustrates a first embodiment of a fluid level sensor assembly 10 of the present invention. The fluid level sensor assembly 10 includes a sensor 12 mounted to a sensor housing 14. A carrier 16 extends from the sensor housing 14 in an angled orientation. A float 18 is located within the carrier 16 and may move freely along the longitudinal axis 19 of the carrier 16.

A connector 20 extends from the sensor housing 14 on an opposing side as the carrier 16. The connector 20 is used to electrically connect the sensor 12 to an external electronic control unit (ECU) to provide a warning indication in the case of low fluid level detected by the sensor 12. For example, when the fluid level sensor assembly 10 is used in a washer reservoir for a vehicle a warning indicator may be alerted with the sensor 12 detects a low fluid level. A grommet 22 (shown in FIGS. 6 and 7) is mounted to the exterior of the sensor housing 14 to seal the fluid level sensor assembly 10 to a reservoir 24, 124 (shown in FIGS. 6 and 7).

The sensor 12 may be a hall effect sensor or a reed switch and the float 18 includes a fragment 26 that is magnetic. The reed switch sensor 12 is mounted to have a perpendicular orientation to the magnetic fragment 26 when the fluid level sensor 10 is assembled. The sensor 12 detects vertical movement of the magnetic fragment 26 relative to the stationary position of the sensor 12 at the sensor housing 14. The carrier 16 has an angled orientation with respect to the sensor 12. In the embodiment shown, the carrier 16 has a 45 degree angle with respect to the sensor 12 and the sensor housing 14. The angled orientation between the carrier 16 and the sensor 12 allows for multiple mounting orientations of the fluid level sensor assembly 10 without requiring use of a different sensor 12, as will described in further detail below. The float 18 must be of sufficient size to maintain buoyancy in the fluid while carrying the weight of the fragment 26.

Referring to FIGS. 1-4, the float 18 may have an oblong shape. Wherein the longer axis 30 of the float 18 is oriented in parallel to the longitudinal axis 19 of the carrier 16. The carrier 16 has a number of fingers 32. The fingers 32 are parallel to the longitudinal axis 19 of the carrier 16 and spaced apart from one another sufficiently to accommodate the width of the float 18 along the shorter axis but are sufficiently close to one another to prevent rotation of the float 18 transverse to the longitudinal axis 19. This arrangement allows the float 18 to slide freely along the longitudinal axis 19 of the carrier 16, while preventing transverse rotation of the float 18 about that axis 19. The fragment 26 may be located on or near one end of the float 18. The end of the float 18 that has the fragment 26 is assembled to be closest to the sensor 12 when the float 18 is located within the carrier 12. Locating the fragment 26 in the closest orientation to the sensor 12 and preventing rotation of the float 18 transverse to the longitudinal axis 19 of the carrier 16 ensures that float 18 is always orientated to have the fragment 26 closest to the sensor 12. This orientation increases the sensitivity of the sensor 12 to the float 18/fragment 26 reducing the size of the fragment 26 required. In turn, the size of the float 18 is also decreased as well as the size of the carrier 16.

Therefore, the float 18 has a generally barrel shape with the fragment 26 located near one end. In addition to preventing transverse rotation of the float 18 about the longitudinal axis 19 of the carrier 16 it may also be desirable to prevent the float 18 from spinning about the longitudinal axis 19 within the carrier 16. The barrel float 18 may define grooves 34 spaced about the circumference of the float 18 running along the longer axis 30. When the float 18 is assembled within the carrier 16 the grooves 34 may be aligned with the fingers 32. Thus, the fingers 32 will prevent the float 18 from spinning about the longitudinal axis 19 of the carrier. Sloshing fluid within the reservoir 24, 124 (shown in FIGS. 6 and 7) may cause the float 18 to rotate and/or spin within the carrier 16. By reducing the rotation and spinning of the float 18 within the carrier 16 this may assist in preventing the float 18 from temporarily binding or sticking to the carrier 16. The float 18 should remain free to move up and down with the fluid level in the reservoir 24, 124 to provide accurate fluid level sensing.

FIG. 3 illustrates an exploded view of the fluid level sensor assembly 10 with a slosh guard 36. If further reduction of the slosh around the float 18 is desired the slosh guard 36 may be assembled on the carrier 16. Due to the angled orientation of the carrier 16 relative to the sensor housing 14 the slosh guard 36 can be assembled on the carrier 16 regardless of the mounting orientation of the fluid level sensor assembly 10 within the reservoir 24, 124 (shown in FIGS. 6 and 7). Therefore, the slosh guard 36 is a universal slosh guard. The slosh guard 36 may be spaced from the sensor housing 14 sufficiently to allow fluid to flow within the carrier 16 such that the float 18 is at the top of the fluid level, but the effect of any sloshing fluid within the reservoir 24, 124 acting on the float 18 is reduced. Couplings 37 are formed on the slosh guard 36 to correspond to couplings 39 formed on the carrier 16. The couplings 37, 39 allow for easy assembly of the slosh guard 36 on the carrier 16 regardless of the mounting orientation of the fluid level sensor assembly 10.

Figure 5:
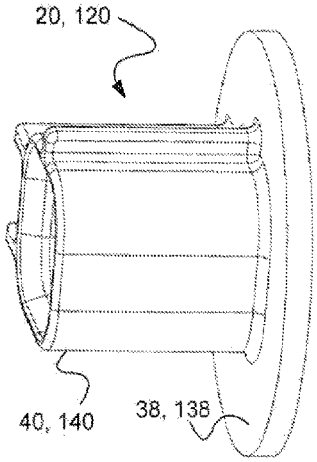
FIG. 5 is a schematic illustration of a perspective view of the connector for the fluid level sensor assembly of the present invention.

FIG. 5 illustrates a perspective view of the connector 20. A socket 40 extends outwardly from a flanged backing 38 to surround and protect a connector pin 42. The flanged backing 38 is secured to the sensor housing 18, e.g. by welding, to retain the connector 20 to the sensor housing 18. The connector pin 42 is secured to the flanged backing 38. For example, the connector pin 42 may be secured to the flanged backing 38 my over-molding the connector pin 42 to the flanged backing 38. The connector pin 42 is electronically connected to the sensor 12 when the connector 20 is secured to the sensor housing 18, such as by soldering the sensor 12 and the connector pin 42 together.

The type and style of the connector pins 42 and socket 40 may be formed to provide the specific style of connection required for connecting the fluid level sensor assembly 10 to the plug and ECU (not shown) style that are being used. The connector pin 42 illustrated is a two-prong connector pin 42 and may be formed in the desired shape and number of prongs, e.g. by die stamping. However, the flanged backing 38 allows for a common manner of coupling the connector pin 42 to the sensor 12 for the fluid level sensor assembly 10. In this manner only the style of connector pin 42 and socket 40 are required to be manufactured for a specific use, such as a specific vehicle model, and the remaining components of the fluid level sensor assembly 10 can be interchangeably manufactured.

Figure 6:
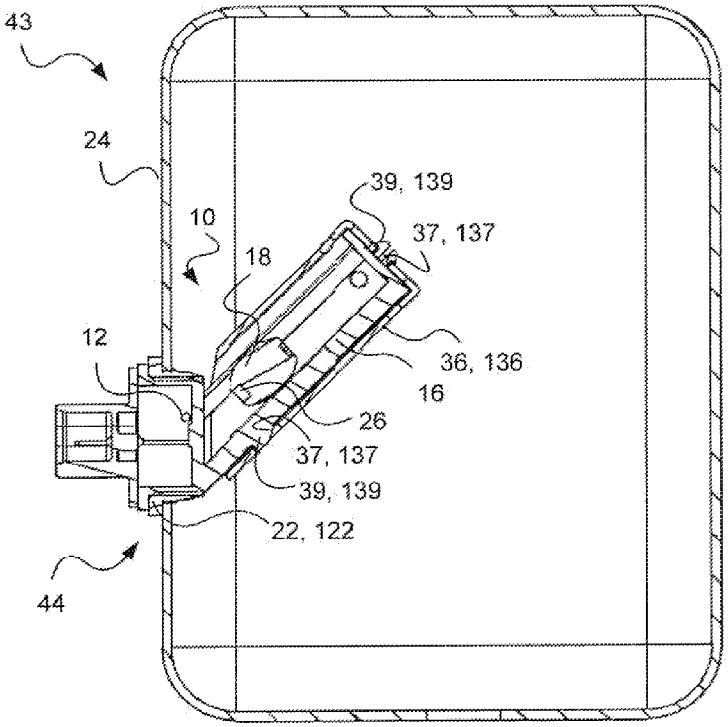
FIG. 6 is a schematic cross-sectional illustration of a side view of the first embodiment of the fluid level sensor and reservoir assembly shown in a side mounted orientation.

FIG. 6 illustrates a cross-sectional view of the fluid level sensor 10 and reservoir assembly 43. The fluid level sensor 10 is mounted to the reservoir 24 having a side oriented mounting location 44 for the fluid level sensor assembly 10. The fluid level sensor assembly 10 is fluidly sealed to the reservoir 24 with the grommet 22. The angled carrier 16 directs the float 18 with fragment 26 at an angle, e.g. 45 degrees, to the sensor housing 14 and connector 20. When the fluid level in the reservoir 24 drops the float 18 drops toward the sensor housing 14 activating the sensor 12, e.g. a perpendicular installed reed switch. The sensor 12, or reed switch in this embodiment, will close due to the magnetic field of the fragment 26 in the float 18. This causes an electrical short between the two prongs of the connector pin 42 for the sensor 12, providing an indication to the ECU (not shown) monitoring the sensor 12. The reed switch or sensor 12 being mounted so that the fragment 26 moves perpendicular to the switch or sensor 12 allows for a smaller body cavity of the fluid level sensor assembly 10, which reduces body material requirements in the fluid level sensor assembly 10.

Figure 7:
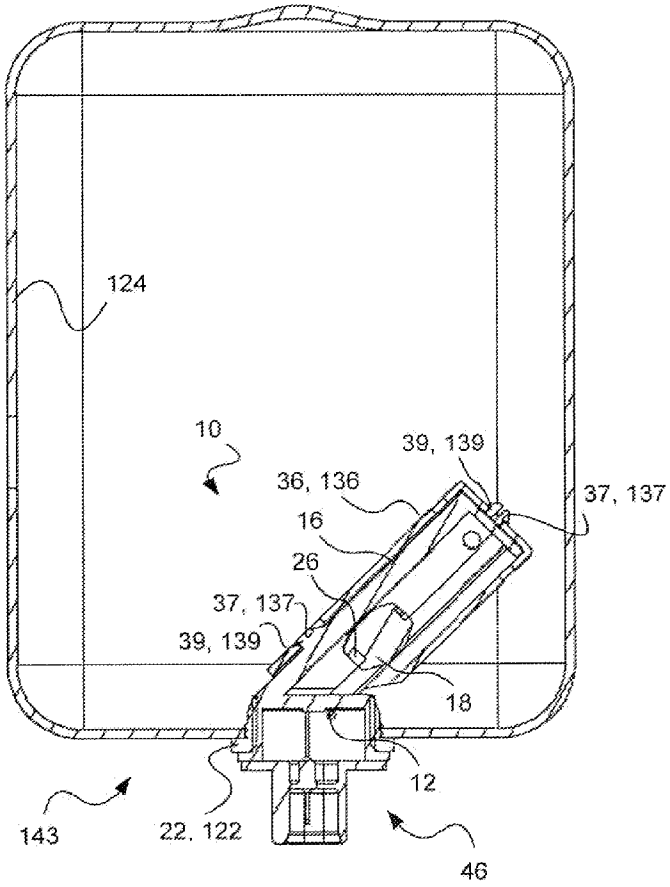
FIG. 7 is a schematic cross-sectional illustration of a side view of the first embodiment of the fluid level sensor and reservoir assembly shown in a bottom mounted orientation.

FIG. 7 illustrates a cross-sectional view of the same fluid level sensor 10 mounted to the reservoir 124 having a bottom oriented mounting location 46 for the fluid level sensor 10 to form a fluid level sensor and reservoir assembly 143. The fluid level sensor 10 is fluidly sealed to the reservoir 24 with the grommet 22. The angled carrier 16 directs the float 18 with the fragment 26 at an angle, e.g. 45 degrees, to the sensor housing 14 and connector 20. When the fluid level in the reservoir 24 drops the float 18 drops toward the sensor housing 14 activating the sensor 12, e.g. a perpendicular installed reed switch. The reed switch or sensor 12 will close due to the magnetic field of the fragment 26 in the float 18. This causes an electrical short between the two prongs of the connector pin 42 for the sensor 12, providing an indication to the ECU (not shown) monitoring the sensor 12. The reed switch or sensor 12 being mounted so that the fragment 26 moves perpendicular to the switch or sensor 12 allows for a smaller body cavity of the fluid level sensor assembly 10, which reduces body material requirements in the fluid level sensor assembly 10. As described above, the fluid level sensor assembly 10 operates in the same manner whether the reservoir 24, 124 has a side oriented mounting location 44, shown in FIG. 6, or a bottom oriented mounting location, shown in FIG. 7. Thus, angled orientation of the carrier 16 to the sensor housing 14 allows multiple mounting orientations of the fluid level sensor assembly 10 without requiring additional components.

Alternatively the sensor 12 may be a hall effect, Magnasphere® or similar sensor to detect a ferrous material in the float 18. That is, the fragment 26 may be made of ferrous material and the sensor 12 may be able to detect ferrous material, such as a Magnasphere® sensor. This will allow for a reduction in the size of the float 18 and a robust design of the sensor 12.

Figure 8:
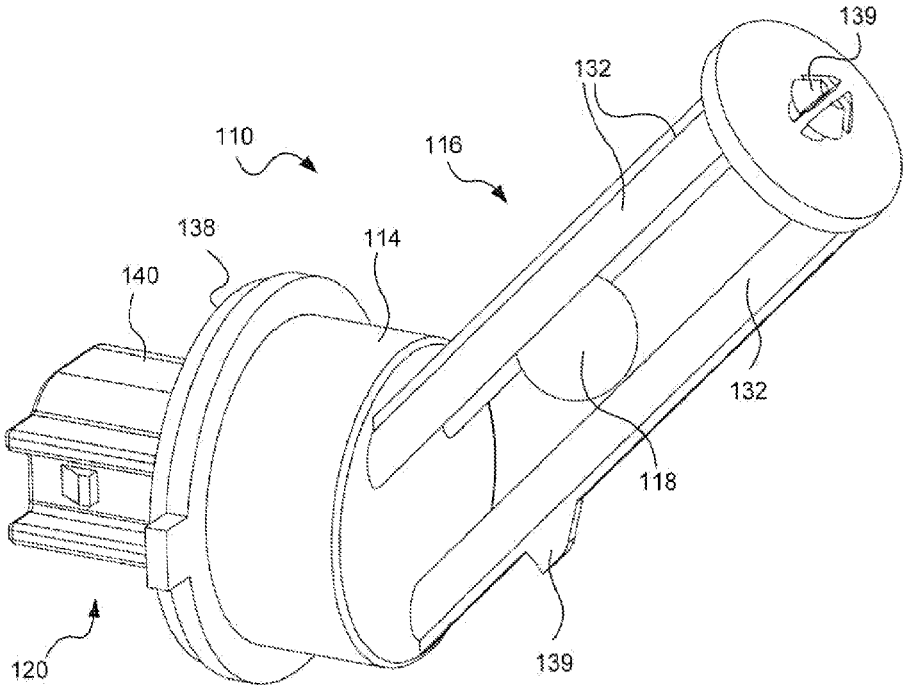
FIG. 8 is a schematic illustration of a perspective view of a second embodiment of a fluid level sensor assembly.
Figure 9:
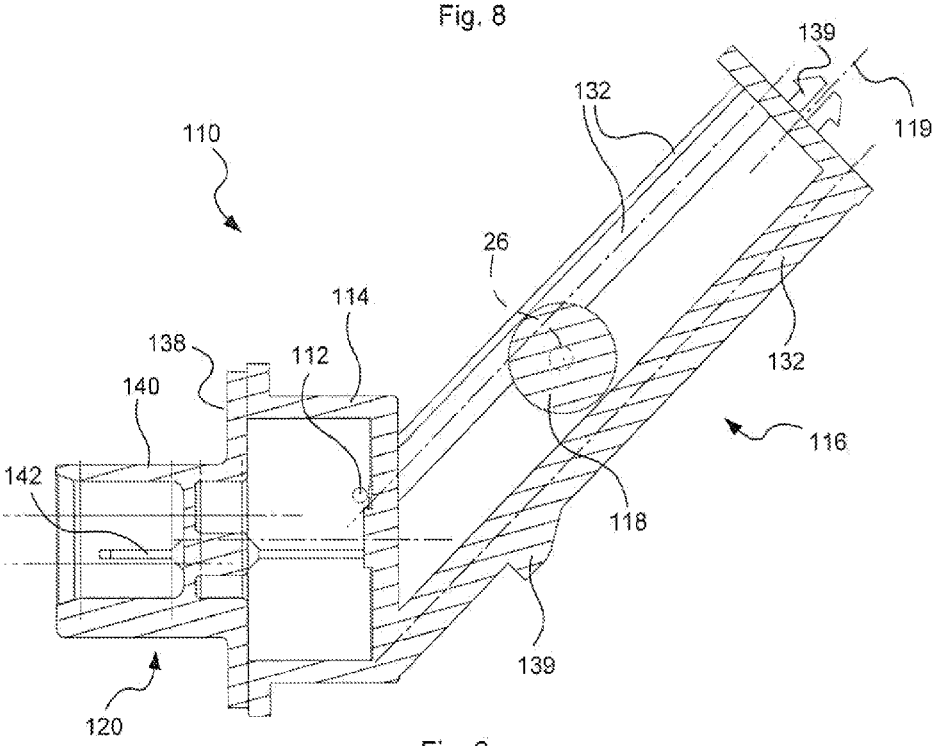
FIG. 9 is a schematic reservoir illustration of a side view of the second embodiment of the fluid level sensor assembly shown in FIG. 5.

FIGS. 8 and 9 illustrate a second embodiment of the fluid level sensor assembly 110. The fluid level sensor assembly 110 includes a sensor 112 mounted to a sensor housing 114. A carrier 116 extends from the sensor housing 114 in an angled orientation. A float 118 is located within the carrier 116 and may move freely along the longitudinal axis 119 of the carrier 116.

A connector 120 extends from the sensor housing 114 on an opposing side as the carrier 116. The connector 20 is used to electrically connect the sensor 112 to an external electronic control unit (ECU) to provide a warning indication in the case of low fluid level detected by the sensor 112. A grommet 122 (shown in FIGS. 6 and 7) is mounted to the exterior of the sensor housing 114 to seal the fluid level sensor assembly 110 to a reservoir 24, 124. FIGS. 6 and 7 illustrate the first embodiment of the fluid level sensor assembly 10 assembled to the reservoirs 24, 124. As described below, the second embodiment of the fluid level sensor assembly 110 is secured to the reservoir 24, 124 in a similar manner and operates in a similar manner as well.

The sensor 112 is a hall effect or a reed switch and the float 118 includes a fragment 126 that has magnetic material. The sensor 112 detects vertical movement of the fragment 126 relative to the stationary position of the sensor 112 at the sensor housing 114. The carrier 116 has an angled orientation with respect to the sensor 112. In the embodiment shown, the carrier 116 has a 45 degree angle with respect to the sensor 112 and the sensor housing 114. The angled orientation between the carrier 116 and the sensor 112 allows for multiple mounting orientations of the fluid level sensor assembly 110 within a reservoir 24, 124, without requiring use of a different sensor 112, as will described in further detail below.

The float 118 is a round ball shape, having the fragment 126 (shown in phantom) located at the core of the float 118. The float 118 moves along the longitudinal axis 119 of the carrier 116 and is retained by a number of fingers 132. The fingers 132 are parallel to the longitudinal axis 119 of the carrier 116 and spaced apart from one another sufficiently to accommodate the float 118. This arrangement allows the float 18 to slide freely along the longitudinal axis 119 of the carrier 116. The float 118 may spin and rotate within the carrier 16. Thus, the fragment 126 is at the core of the float 118, such that the spinning and rotating of the float 118 within the carrier 116 does not affect the sensor 112 reading. The float 118 should remain free to move up and down with the fluid level in the reservoir 24, 124 to provide accurate fluid level sensing.

FIG. 3 illustrates an exploded view of the fluid level sensor assembly 10 with a slosh guard 36. The same slosh guard 36 may also be used with the second embodiment of the fluid level sensor assembly 110. FIGS. 6 and 7 illustrate the slosh guard 136. If further reduction of the slosh around the float 118 is desired the slosh guard 136 may be assembled on the carrier 116. Due to the angle orientation of the carrier 116 relative to the sensor housing 114 the slosh guard 136 can be assembled on the carrier 116 regardless of the mounting orientation of the fluid level sensor assembly 110 within a reservoir 24, 124 (shown in FIGS. 6 and 7). Therefore, the slosh guard 136 is a universal slosh guard 136. The slosh guard 136 may be spaced from the sensor housing 114 sufficiently to allow fluid to flow within the carrier 116 such that the float 118 is at the top of the fluid level, but the effect of any sloshing fluid within the reservoir 24, 124 acting on the float 18 is reduced. Couplings 137 are formed on the slosh guard 136 to correspond to couplings 139 formed on the carrier 116. The couplings 137, 139 allow for easy assembly of the slosh guard on the carrier 116 regardless of the mounting orientation of the fluid level sensor assembly 110.

FIG. 5 illustrates a perspective view of the connector 120. A socket 140 extends outwardly from a flanged backing 138 to surround and protect a connector pin 142. The flanged backing 138 is secured to the sensor housing 118, e.g. by welding, to retain the connector 120 to the sensor housing 118. The connector pin 142 is secured to the flanged backing 138. For example, the connector pin 142 may be secured to the flanged backing 138 my over-molding the connector pin 142 to the flanged backing 138. The connector pin 142 is electronically connected to the sensor 112 when the connector 120 is secured to the sensor housing 18, such as by soldering the sensor 112 and the connector pin 142 together.

The type and style of the connector pins 142 and socket 140 may be formed to provide the specific style of connection required for connecting the fluid level sensor assembly 110 to the plug and ECU (not shown) style that are being used. The connector pin 42 illustrated is a two-prong connector pin 142 may be formed in the desired shape and number of prongs, e.g. by die stamping. However, the flanged backing 138 allows for a common manner of coupling the connector pin 142 to the sensor 112 for the fluid level sensor assembly 110. In this manner only the style of connector pin 142 and socket 140 are required to be manufactured for a specific use and the remaining components of the fluid level sensor assembly 110 can be interchangeably manufactured.

Referring back to FIGS. 8 and 9, the fluid level sensor assembly 120 can be mounted to a reservoir 24 (shown in FIG. 6) having a side oriented mounting location 44 for the fluid level sensor assembly 110. The fluid level sensor assembly 110 is fluidly sealed to the reservoir 24 with the grommet 122. The angled carrier 116 directs the float 118 with fragment 126 at an angle, e.g. 45 degrees, to the sensor housing 114 and connector 120. When the fluid level in the reservoir 24 drops the float 118 drops toward the sensor housing 114 activating the sensor 112, e.g. a perpendicular installed reed switch. The reed switch or sensor 112 will close due to the magnetic field of the fragment 126 in the float 118. This causes an electrical short between the two prongs of the connector pin 142 for the sensor 112, providing an indication to the ECU (not shown) monitoring the sensor 112. The reed switch or sensor 112 being mounted so that the magnetic fragment 126 moves perpendicular to the switch or sensor 112 allows for a smaller body cavity of the fluid level sensor assembly 110, which reduces body material requirements in the fluid level sensor assembly 110.

The fluid level sensor assembly 110 operates in the same manner as described above when in a bottom oriented mounting location 46. Thus, the fluid level sensor assembly 110 operates in the same manner whether the reservoir 24, 124 has a side oriented mounting location 44 or a bottom oriented mounting location 46.

Alternatively the sensor 112 may be a hall effect, Magnasphere® or similar sensor to detect a ferrous material in the float 118. That is the fragment 26 at the core may be of ferrous material and the sensor 112 is the type that may detect the ferrous material, such as a Magnasphere® sensor. This will allow for a reduction in the size of the float 118 and a robust design of the sensor 112.

The fluid level sensor assembly 10, 110 may be used in a number of applications. It would be useful in windshield washer bottles, antifreeze overflow containers, brake fluid bottles, transmission fluid bottles, gas tank level, and many more. It could also have many non-automotive applications where fluid level must be read. The above description is related to fluid level sensor and reservoir assembly 43, 44 for a washer bottle fluid level detection for a vehicle but is not limited to this usage.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A fluid level sensor assembly comprising:

a sensor [mounted] *coupled* to a sensor housing;

a carrier extending from the sensor housing in an angled orientation;

a float located within the carrier such that the float may move along a longitudinal axis of the carrier;

a fragment secured to *one end of* the float, wherein the sensor [detects a location of] *is activated by the presence of* the fragment *within a field of the sensor*; and wherein the float has [a barrel] *an oblong* shape and [the fragment is secured to one end of the float, and] wherein the float is assembled within the carrier such that the fragment end is closest to the sensor, and wherein the width of the carrier prevents the float from rotating traverse to the longitudinal axis of the carrier.

2. The fluid level sensor assembly of claim 1, wherein the carrier further comprises a plurality of fingers extending from the sensor housing and parallel to the longitudinal axis of the carrier, and wherein the fingers are spaced from one another sufficiently to allow the float to be assembled within the carrier such that the longer axis of the [barrel shaped] float is parallel to the longitudinal axis of the carrier.

3. The fluid level sensor assembly of claim 2, wherein the float further comprises a plurality of grooves spaced about the circumference of the float and extending parallel to the longer axis of the float, and when the float is assembled within the carrier the plurality of grooves may be aligned with the plurality of fingers, such that the finger will prevent the float from spinning about the longitudinal axis of the carrier.

4. The fluid level sensor assembly of claim 1, wherein the float has a [round] *barrel* shape with one of a magnetic core and a ferrous core.

5. The fluid level sensor assembly of claim 1, wherein the carrier has a 45 degree orientation with respect to the sensor housing.

6. The fluid level sensor assembly of claim 1, further comprising a connector secured to the sensor housing on an opposing side from the carrier, wherein the connector has a connector pin electrically connected to the sensor, and a flanged backing to secure the connector to the sensor housing.

7. The fluid level sensor assembly of claim 1, wherein fluid level sensor assembly is mountable to one of: a reservoir having a side mounting location orientation and a reservoir having a bottom mounting location orientation.

8. The fluid level sensor assembly of claim 1, wherein the sensor, carrier and float are secured to a washer reservoir for a vehicle washer system.

9. The fluid level sensor assembly of claim 1, wherein the fragment is a magnetic material and the sensor is a reed switch in perpendicular orientation to the fragment.

10. The fluid level sensor assembly of claim 1, wherein the fragment is one of a magnetic material and a ferrous material.

11. The fluid level sensor assembly of claim 1, further comprising a slosh guard secured to the carrier in a universal manner for the fluid level sensor.

12. A fluid level sensor assembly comprising:

a reservoir for a vehicle washer system;

a reed switch [mounted] *coupled* to a sensor housing [and secured to the reservoir];

a carrier extending from the sensor housing in an angled orientation wherein the reservoir has one of a side mounting location and a bottom mounting location for the carrier;

a float with [a barrel] *an oblong* shape located within the carrier such that the float may move along a longitudinal axis of the carrier and is prevented from rotating transverse to the longitudinal axis of the carrier;

a magnetic fragment secured at one *end* of the float, wherein the float is assembled within the carrier such that the magnetic fragment is closest to the reed switch wherein the reed switch [detects a location] *is activated by the presence* of the magnetic *fragment within a magnetic field of the reed switch*; and wherein the carrier further comprises a plurality of fingers extending from the sensor housing and parallel to the longitudinal axis of the carrier, and wherein the fingers are spaced from one another sufficiently to allow the float to be assembled within the carrier such that the longer axis of the [barrel shaped] float is parallel to the longitudinal axis of the carrier, such that the finger prevents the float from rotating traverse to the longitudinal axis of the carrier.

13. The fluid level sensor assembly of claim 12, wherein the float further comprises a plurality of grooves spaced about the circumference of the float and extending parallel to the longer axis of the float, and when the float is assembled within the carrier the plurality of grooves may be aligned with the plurality of fingers, such that the finger will prevent the float from spinning about the longitudinal axis of the carrier.

14. The fluid level sensor assembly of claim 12, wherein the carrier has a 45 degree orientation with respect to the sensor housing.

15. The fluid level sensor assembly of claim 12, further comprising a connector secured to the sensor housing on an opposing side from the carrier, wherein the connector has a connector pin electrically connected to the sensor, and a flanged backing to secure the connector to the sensor housing.

16. The fluid level sensor assembly of claim 12, wherein fluid level sensor assembly is mountable to one of: a reservoir having a side mounting location orientation and a reservoir having a bottom mounting location orientation.

17. The fluid level sensor assembly of claim 12, further comprising a slosh guard secured to the carrier in a universal manner for the fluid level sensor.

18. A washer reservoir and fluid level sensor assembly comprising: a fluid level sensor comprising;

a sensor [mounted] *coupled* to a sensor housing; a carrier extending from the sensor housing in an angled orientation; a float located within the carrier such that the float may move along a longitudinal axis of the carrier;

a fragment secured to *one end of* the float, wherein the sensor [detects a location of] *is activated by the presence* of the fragment *within a field of the sensor*, wherein the float has [a barrel] *an oblong* shape [and the fragment is secured to the one end of the float,] and wherein the float is assembled within the carrier such that the fragment end is closest to the sensor, and wherein the width of the carrier prevents the float from rotating traverse to the longitudinal axis of the carrier;

a connector secured to the sensor housing on an opposing side from the carrier, wherein the connector has a connector pin electrically connected to the sensor, and a flanged backing to secure the connector to the sensor housing; and a grommet assembled on the exterior of the sensor housing; and a reservoir for a vehicle washer system having one of a side mounting location and a bottom mounting location, wherein the fluid level sensor is assembled at the mounting location such that the grommet fluidly seals the fluid level sensor within the reservoir and the connector is accessible to the exterior of the washer reservoir.

19. The washer reservoir and fluid level sensor assembly of claim 18, wherein the carrier further comprises a plurality of fingers extending from the sensor housing and parallel to the longitudinal axis of the carrier, and wherein the fingers are spaced from one another sufficiently to allow the float to be assembled within the carrier such that the longer axis of the [barrel shaped] float is parallel to the longitudinal axis of the carrier.

20. The washer reservoir and fluid level sensor assembly of claim 19, wherein the float further comprises a plurality of grooves spaced about the circumference of the float and extending parallel to the longer axis of the float, and when the float is assembled within the carrier the plurality of grooves may be aligned with the plurality of fingers, such that the finger will prevent the float from spinning about the longitudinal axis of the carrier.

21. The washer reservoir and fluid level sensor assembly of claim 18, wherein the carrier has a 45 degree orientation with respect to the sensor housing.

22. The washer reservoir and fluid level sensor assembly of claim 18, wherein the connector further comprises a socket extending from the flanged backing and surrounding the connecting pin, and wherein the socket and connector pin each have a specific shape based upon the model of vehicle the washer system is for.

23. The washer reservoir and fluid level sensor assembly of claim 18, wherein the float has a [round] *barrel* shape with one of a magnetic core and a ferrous core.

24. The washer reservoir and fluid level sensor assembly of claim 18, wherein the fragment is a magnetic material and the sensor is a reed switch in perpendicular orientation to the fragment.

25. The washer reservoir and fluid level sensor assembly of claim 18, wherein the fragment is one of a magnetic material and a ferrous material.

26. The washer reservoir and fluid level sensor assembly of claim 18, further comprising a slosh guard secured to the carrier in a universal manner for the fluid level sensor.

* * * * *